Nov. 18, 1969    C. E. PRESNELL ET AL    3,478,444
OCEAN CURRENT AND WAVE GENERATOR

Filed Nov. 28, 1967    4 Sheets-Sheet 1

CARLTON E. PRESNELL
GUIDO Z. ZEMGALS
INVENTORS

BY John F. Miller
Agent
John M. _____
Attorney

CARLTON E. PRESNELL
GUIDO Z. ZEMGALS
INVENTORS

United States Patent Office 3,478,444
Patented Nov. 18, 1969

3,478,444
OCEAN CURRENT AND WAVE GENERATOR
Carlton E. Presnell, Pasadena, and Guido Z. Zemgals, San Gabriel, Calif., assignors by mesne assignments, to the United States of America
Filed Nov. 28, 1967, Ser. No. 686,231
Int. Cl. G09b 23/06; G01m 9/00
U.S. Cl. 35—19   10 Claims

ABSTRACT OF THE DISCLOSURE

This invention provides means for readily studying and demonstrating wave, current, and wind action on and in a body of water, which were lacking in the prior art. Such means are provided in the form of a liquid filled glass fronted tank containing a plenum chamber which is connected to a pneumatic compressor and valving system to generate wave action in the liquid. Additional compressors and a pump, together with connecting ducts and plumbing, are provided to generate wind, tide and current effects. Models of marine structures and/or natural formations may be locked in the tank magnetically for studies and demonstrations. Means for introducing particles and/or dyes into thte tank are provided for demonstrating currents, aggredation and degradation of the ocean floor, and mass transport, as of sand and other materials. The tank may be expanded and/or the bottom surface contour altered readily by the use of the models.

Background of the invention

The invention is in the field of simulator devices. In the prior art no convenient way or apparatus was known for studying and demonstrating the effects and interrelationships of waves, winds, tides, and currents, on and with natural formations such as beaches, bottoms, etc., and artificial structures such as piers, jetties, sea walls, etc. These effects could be studied in the field at prohibitive costs but no apparatus for reproducing them readily and inexpensively in laboratory and classroom was available.

Summary of the invention

The invention accomplishes its primary objects of providing means for readily studying and demonstrating waves, currents, winds, and tides, and their effects on artificial structures and natural formations by providing a glass fronted liquid filled tank small enough for laboratories and classrooms and large enough for accurate demonstrations in which the desired effects are produced. The tank is part of a compact, portable, structure housing the necessary compressors, tanks, motors, controls, ducting, and plumbing. Models of structures and natural formations may be quickly positioned and locked on the tank floor by magnetic means. Dye and particle introducing means are provided to demonstrate various marine effects, such as currents and mass transport. All the apparatus may be operated from a conveniently located control panel.

Description of the preferred embodiment

Figure 1:
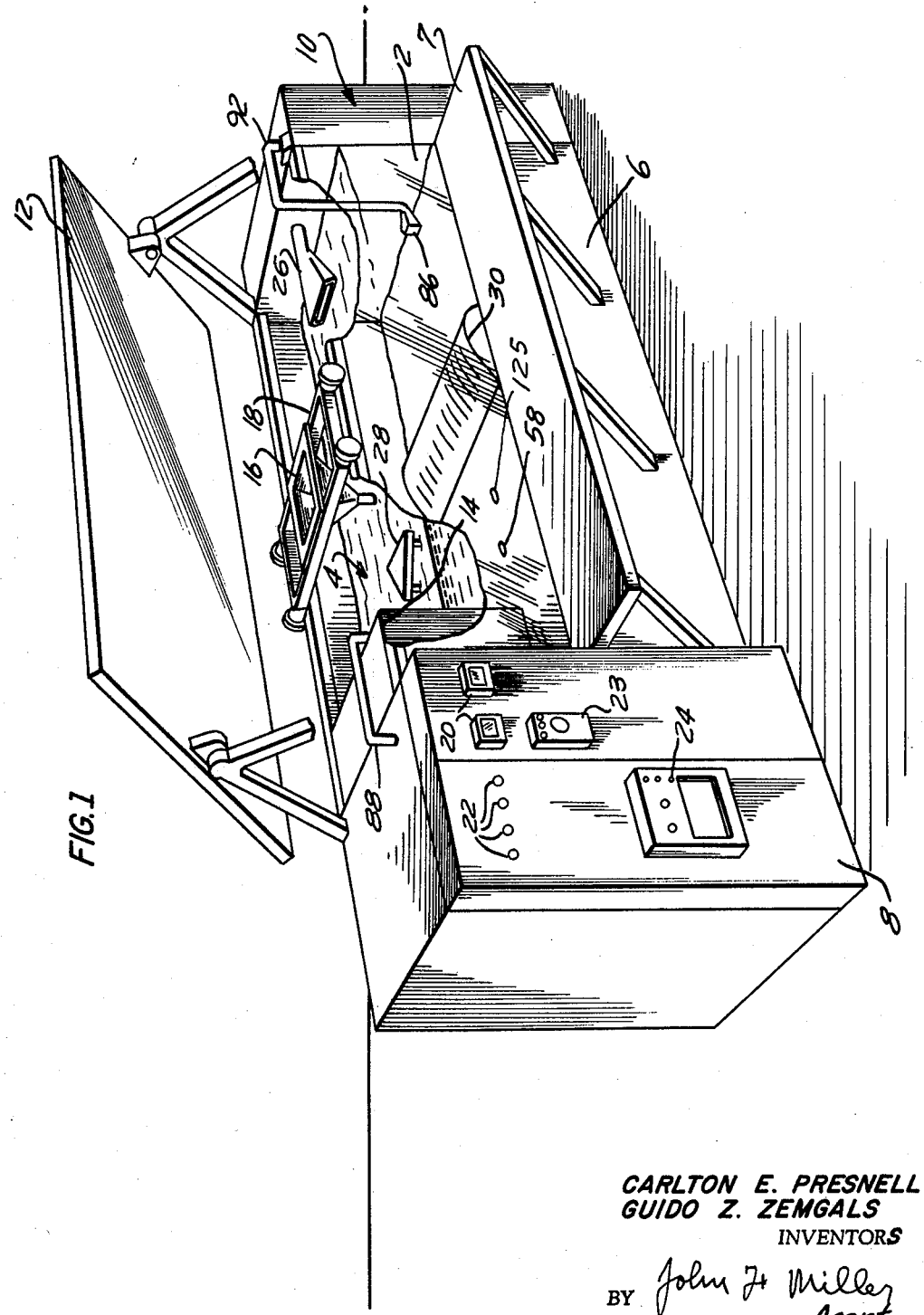
FIG. 1 is an exterior view of the apparatus of the invention.
Figure 2:
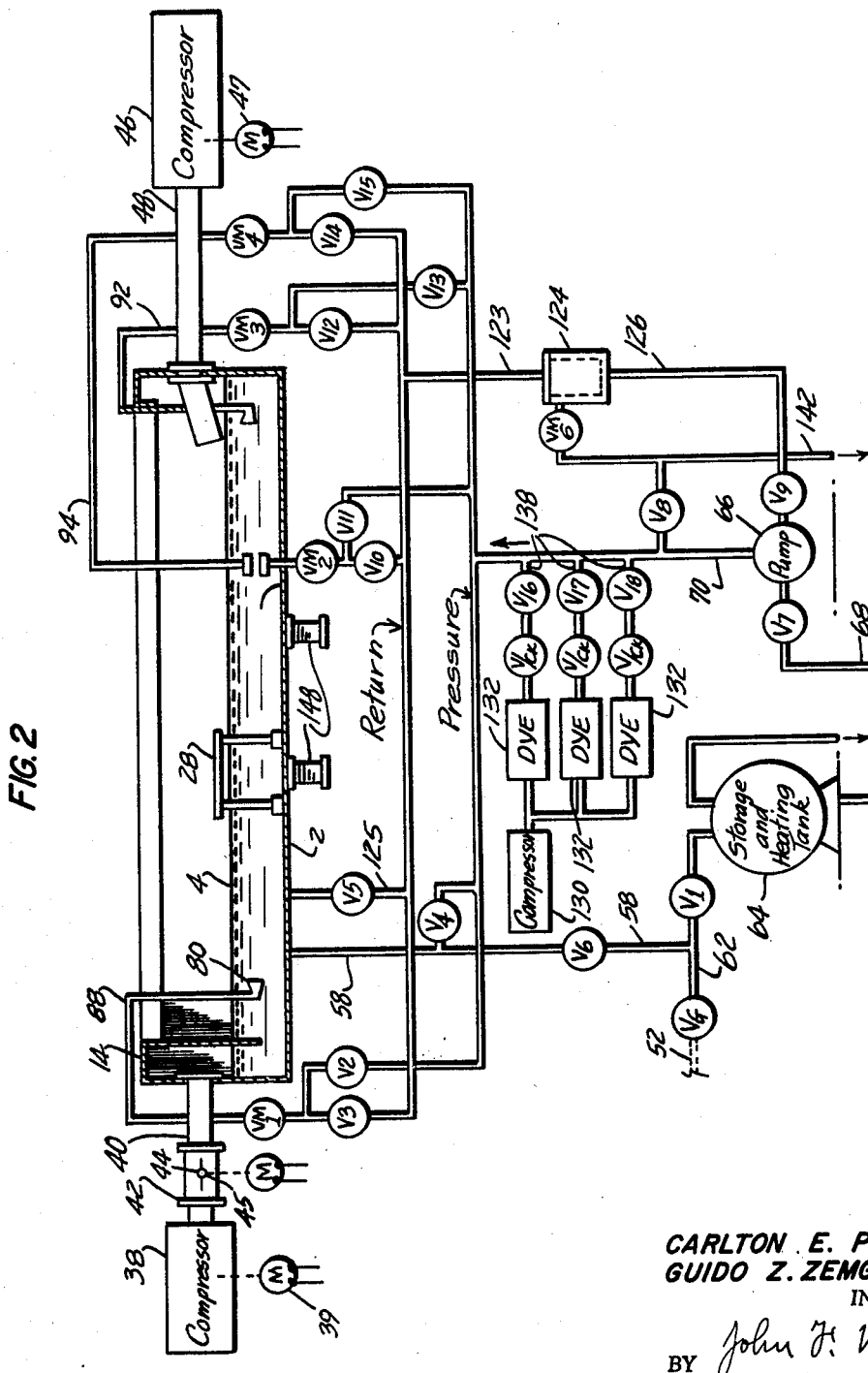
FIG. 2 is schematic showing of hydraulic and pneumatic circuits connected to a sectional view of tank 2 cut on a vertical plane lengthwise through the center.

The general arrangement of the invention is illustrated in FIGS. 1 and 2. In FIG. 1, a glass fronted tank 2 is shown partially filled with a liquid 4. Liquid 4 may be water or other suitable liquid. A base 6 and end sections 8 and 10 are shown. Mirror 12 is adjustably mounted on the supports shown to present a surface view of liquid 4 to an observer in front of tank 2. A platform or walkway 7 is fixed to base 6. A plenum chamber 14 is located in one end of tank 2. Plenum chamber 14 is in the form of a closed box open at the bottom and with an inlet opening in the upper part for an air duct which is located behind panel 8. A varying air pressure is generated in plenum chamber 14 in a manner to be explained presently to create waves on liquid 4. Hopper 16 is used to distribute particles in liquid 4. An air deflector 26 is shown which is connected to air ducting not visible in FIG. 1. An air flow through deflector 26 produces waves which simulate wind caused waves in the ocean. A Texas tower 28 is one of several models of man made structures which may be used for studies of their susceptibility to waves, winds, and currents. A sandbar 30 is one of several models of natural topographic formations which may be used to study and/or demonstrate their effects on and interrelationships with waves, winds and currents. An arrangement of electromagnets not visible in FIG. 1 is located under tank 2 and controllable from panel 8 to releasably lock models such as 28 and 30 to the tank floor. A current nozzle 86 is one of four similar nozzles positioned one at each end and one at each side of tank 2. Only nozzle 86 is shown. All nozzles are connected by pipes such as pipe 92 to a pump located inside base 6. Liquid 4 is pumped through the nozzles to create underwater currents in any pattern desired. Valves are located in the pipes to adjust the pattern. A pipe 58 in the bottom of tank 2 is provided for filling and for injecting dye into liquid 4 from three pressurized dye tanks located under tank 2 in base 6. A system of valves controllable from panel 8 permits any dye or combination of dyes to be injected into liquid 4 through pipe 58 or alternatively through any of the current nozzles. A separate compressor is controllable to pressurize the dye bottles. A pipe 125 is provided in the bottom of tank 2 for draining.

Control 23 on end panel 8 is exemplary of the controls used to control variable speed motors driving the compressors for plenum chamber 14, wind deflector 26, and a rotary valve system associated with the compressor for plenum chamber 14. Instruments 20 are exemplary of standard instruments such as tachometers, ammeters, etc., installed on panel 8 to monitor the operation of the several elements, e.g., the speed of the valve system and the frequency of the waves in tank 2. Recorder 24 may be a known off-the-shelf recorder, e.g., a chart recorder affixed to monitor the operation of the apparatus. In the preferred embodiment, 24 is arranged to record wave height using information from a standard transducer such as a float operated potentiometer located in tank 2. Push button switches 22 are exemplary of many control switches located on panel 8. All of the control elements on panel 8 are not shown in FIG. 1, since they are shown in the schematics of other figures and would complicate FIG. 1 without aiding in the explanation of the invention. Since controls, instruments, recorders, etc., such as shown in FIG. 1 are well known and their application well understood, they will not be described further.

FIG. 2 shows a schematic view of the pneumatic and hydraulic systems of the invention connected to a sectional view of tank 2 cut on a vertical plane lengthwise through the center. Here a compressor 38 is connected to furnish air to plenum chamber 14 through a duct 40 containing a manifold section 42. There are four manifold sections 42 only one of which is visible in FIG. 2. Each manifold section contains a rotating butterfly valve 44 each of which rotates ninety degrees out of phase with the adjacent valves. Valves 44 are all geared to a single variable speed motor 47. Compressor 38 is geared to another variable speed motor 39. These motors are controllable from panel 8 (FIG. 1). Rotation of valves 44 causes the air pressure in plenum chamber 14 to increase and decrease cyclically in a sinusoidal manner. Since the bottom of plenum chamber 14 is open to tank 2, this varying air pressure bearing on the surface of the liquid 4 in plenum chamber 14 creates waves in the tank of a magnitude proportional to the speed of compressor 38 and of a frequency determined by the speed of rotation of valves 44. Wind driven waves may be created on the surface of liquid 4 by air from a compressor 46 flowing through duct 48 and deflector 26. Compressor 46 is driven by a variable speed motor 49 so that the air flow is variable.

Liquid inlet pipe 52 and inlet valve VG control the liquid supply from an outside source. Valve V6 in pipe 58 may be opened to fill tank 2 directly from the source, or valve V3 in pipe 62 may be opened to fill a storage and heating tank 64. Here the liquid may be heated if desired and a pump 66 used to send the heated liquid to tank 2 through pipes 68, 70, 72, and 58 by opening valves V7 and V4. This creates a "rising tide" effect in tank 2. Valve V4 may be closed and the liquid from pump 66 supplied from pressure pipe 72 to any or all of current nozzles 80, 82, 84 and 86. This is accomplished by opening valves V2, V11, V13, and V15 in current nozzle supply pipes 88, 90, 92, and 94, which connect the respective nozzles to pressure pipe 72. Selected ones of valves V3, V10, V12, and V14 which connect the current nozzle supply pipes to a return pipe 112 may be operated in conjunction with selected ones of valves V2, V11, V13, and V15 to establish recirculating currents by using pump 66 and connecting pipes 123, 126, and 70 to pump liquid in certain nozzles and out other nozzles. The above mentioned valves are solenoid operated valves controlled selectively by push button switches 22 on end panel 8 (FIG. 1). The current nozzles are adjustable laterally and vertically to establish a current or combinations of currents in any part of tank 2. The valves VM in the respective current supply pipes are manual valves which may be used to adjust the output of the current nozzles individually. A valve V5 may be opened in a drain pipe 125 to drain tank 2 directly into return pipe 112. The liquid in return pipe 112 may flow through pipe 123, filter 124, and a manual valve VM/6 in filter drain pipe 142 to drain tank 2.

Filter 124 is used to filter out particles such as colored plastic chips used in tank 2 to study currents, sea floor shifts, etc.

A compressor 130 may be controlled from panel 8 (FIG. 1) to pressurize dye tanks 132. A check valve V/CK and a solenoid valve such as V16, V17, or V18 in one of outlet pipes 138 connect each dye tank to pipe 70, thereby enabling the selective insertion of dyes into tank 2 through pipe 58 or any or all of the current nozzles in the manner described above. The dyes aid in current and wave studies and demonstrations.

Electromagnets 148 are shown under the bottom of tank 2, one directly under Texas tower model 28 and one directly under sand bar model 30. These are fixed under the tank and controlled from panel 8 to hold the models in position on the bottom of the tank. There are thirteen electromagnets 148 located under tank 2 in the preferred embodiment, making possible the instantaneous fastening or releasing of models in any location in the tank.

Figure 3:
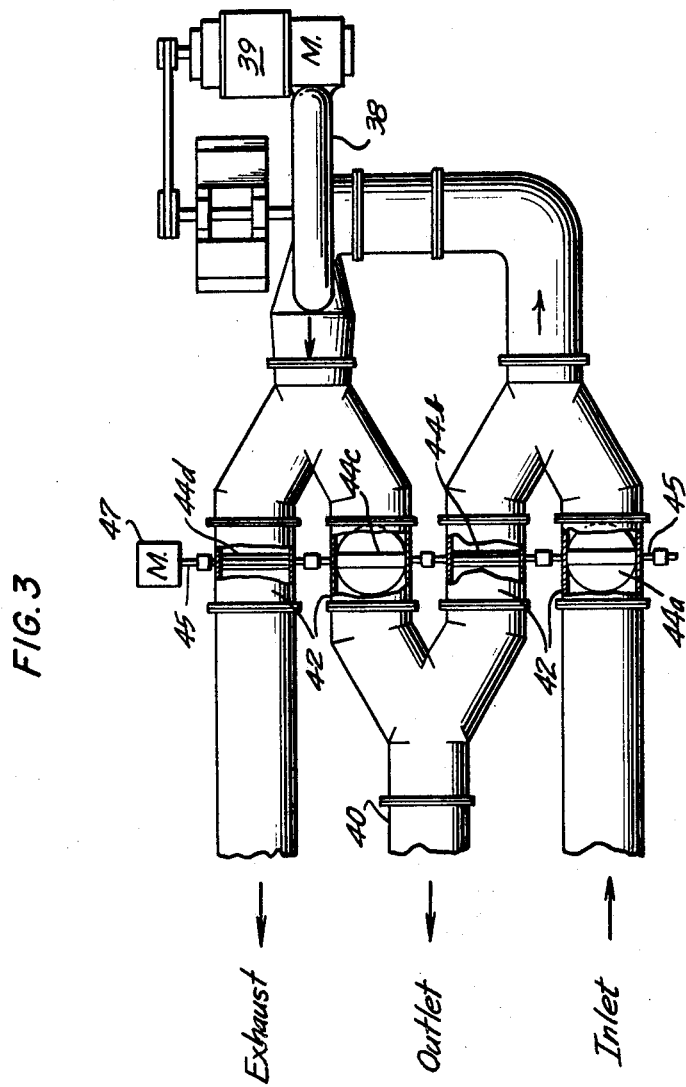
FIG. 3 shows the arrangement of a compressor and pneumatic valves for developing a sinusoidal variation in air pressure.

FIG. 3 shows the arrangement of compressor 38 and valves 44 in manifold sections 42 which supplies air at cyclically varying pressure to plenum chamber 14 in tank 2. Compressor 38 is driven by a variable speed motor 39 controllable from panel 8 (FIG. 1) to furnish air at a desired pressure. Valves 44 are all fixed to a common shaft 45 passing through the manifold sections and geared to a variable speed motor 47. As noted previously, the speed of compressor 38 governs the magnitude of the waves in tank 2 and the speed of rotation of valves 44 governs the frequency of the waves in tank 2. The water level in plenum chamber 14 is modulated by the varying air pressure in a sinusoidal manner. With valves 44 in the position shown in FIG. 3, air enters past valve 44a into compressor 38 and goes from 38 at a higher pressure to valves 44c and 44d. Valve 44d is closed so all of the air from 38 goes through open valve 44c and outlet duct 40 to raise the pressure in plenum chamber 14. This high pressure lowers the water level in the plenum, and raises the water level outside the plenum. As shaft 45 rotates valves 44a and 44c begin to close and valves 44b and 44d begin to open. Since valves 44b and 44d are now partially open, some of the air from 38 is exhausted through 44d and the plenum pressure is decreased by suction through 44b. When shaft 45 has rotated $\pi/4$ radians, the net pressure in the plenum is zero because valves 44a, 44b, 44c and 44d are all equally open. As shaft 45 continues to rotate valve 44b will be more open than valve 44a so that suction from compressor 38 will cause air to be withdrawn from the plenum 14 through valve 44b, lowering the pressure in plenum 14 still further. When shaft 45 reaches $\pi/2$ radians this effect is at a maximum since valve 44a is closed and valve 44b is wide open and valve 44c is closed and valve 44d is wide open. This creates the greatest negative pressure in 14 and causes the water level in plenum 14 to rise, creating the negative portion of a wave in tank 2. Further rotation of shaft 45 to $3\pi/4$ radians causes the pressure to rise again in plenum 14 because all the valves 44 are equally open and the net effect on the pressure in plenum 14 is zero. Further rotation of shaft 45 to $\pi$ radians completes the cycle. Thus, waves are created in tank 2 by the alternating pressure in plenum chamber 14 at the frequency of valves 44 and of a magnitude proportional to the speed of compressor 38.

Figure 4:
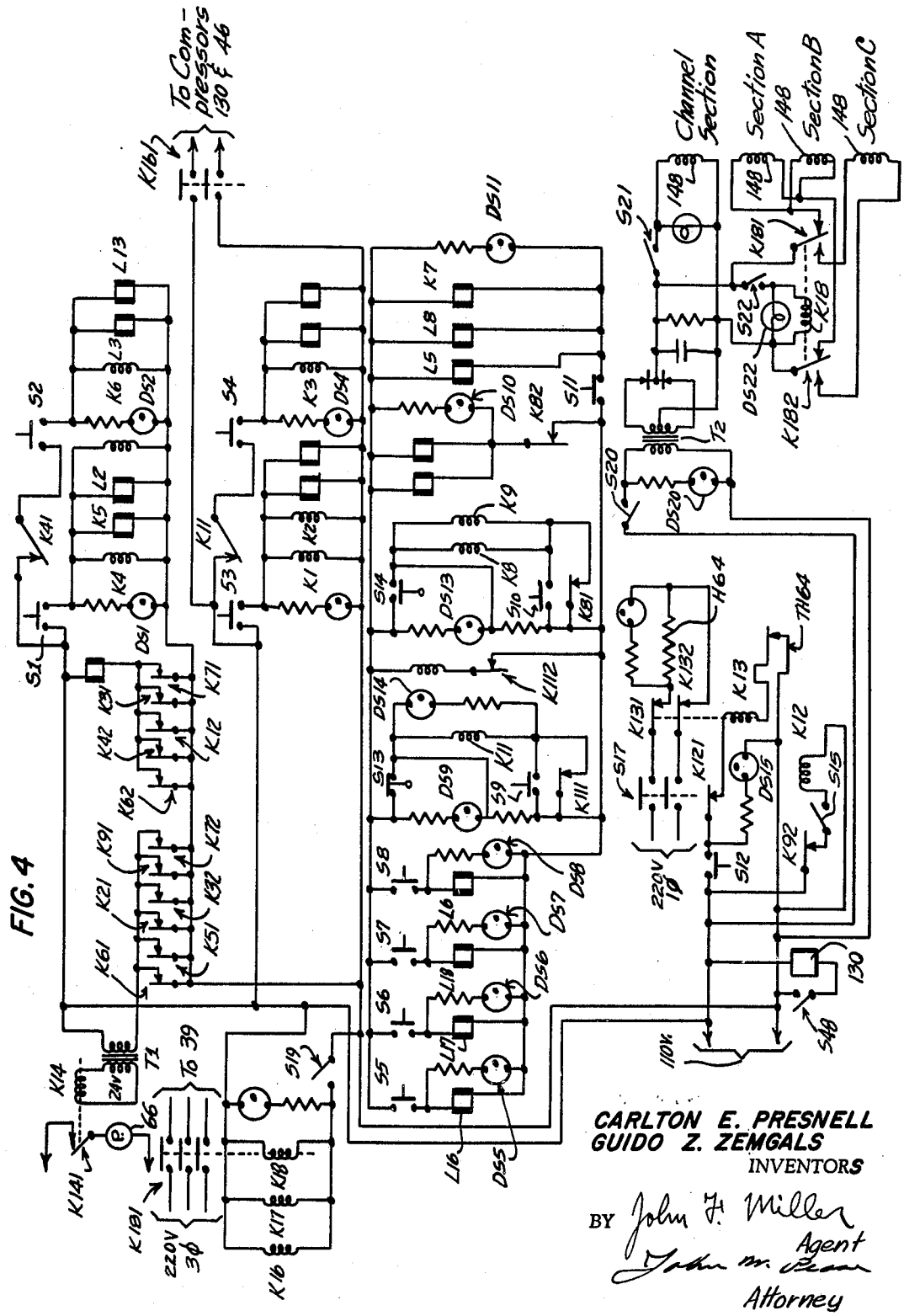
FIG. 4 is a schematic showing of the electrical circuits of the invention.

FIG. 4 shows operating circuitry for the hydraulic and pneumatic control apparatus of tank 2. Most of the switches and indicator lights shown in FIG. 4 are physically located on end panel 8 (FIG. 1), but only exemplary ones are shown in FIG. 1 to avoid complication of the drawings. The relays, solenoids, and other components shown in FIG. 4 are, with the apparatus of FIG. 2, physically located behind end panels 8 and 10 and under tank 2 inside base 6. Referring now to FIG. 4, a power switch S19 is closed to actuate power supply relays K16, K17, and K18. K16 closes a two pole switch K161 to supply 110 volt power to compressors 130 and 46. K17 closes a two pole switch K171 to supply 220 volt power to the heater H64 of storage and heating tank 64. K18 closes a three pole switch K181 to supply 220 volt three phase power to compressor motor 39 through a controller not shown. When current switch S1 is closed, relays K4 and K5 are actuated and solenoids L2 and L12 open valves V2 and V12 to current nozzles 80 and 86 (FIG. 2). Contacts K41 of relay K4, which are normally closed, open so that current switch S2 would be ineffective if closed. Contacts K42 close operating solenoid L9 to open valve V9 (FIG. 2) in the return line between tank 2 and pump 66. Contacts K51 close, thereby applying 110 volts to the primary winding of transformer T1. This voltage is stepped down to 24 volts in the secondary winding and actuates relay K14, closing contacts K141 to apply 220 volts to the motor of pump 66. This causes water to be pumped from current nozzle 86 (FIG. 2), through valve V12, return pipe 112, pipe 123, filter 124, pipe 126, valve V9, pump 66, pipes 70, 72 and valve V2 out through current nozzle 80. This creates a recirculating current in tank 2 between nozzles 86 and 80. Opening switch S1 returns the circuit to its original condition, closing the above mentioned solenoid operated valves, stopping pump 66 and the recirculating current. To pump liquid 44 in the opposite direction in tank 2, creating an opposite current, switch S2 is closed (S1 being open). This actuates relay K6 and solenoids L3 and L13, opening valves V3 and V13 (FIG. 2), thereby connecting nozzle 80 to return pipe 112 and nozzle 86 to pressure pipe 72. Valve V9 is opened by solenoid L9 in response to closing of contacts K62. Contacts K61 close, causing the closing of relay K14 to apply voltage to the motor of pump 66.

Currents are established between current nozzles 82 and 84 in a manner obvious from the above description by operation of current switches S3 or S4.

Since current nozzles 80 and 86 are located at opposite ends of tank 2 and current nozzles 82 and 84 are located on opposite sides of the tank as shown, currents at right angles to each other can be created by closing S1 or S2 and S3 or S4. Since the nozzles are adjustable laterally and vertically, any current or combination of currents can be readily created in tank 2 to accomplish any experiment or demonstration involving currents.

To inject a dye into tank 2, switch S48 is closed to start compressor 130. Then closing S5, S6 or S7 to operate a solenoid L16, L17, or L18, which actuates a valve V16, V17, or V18 (FIG. 2), injects dye into pipe 70 and pressure pipe 72 and into the tank through one or more of the current nozzles or fill pipe 58 in the manner previously described.

To fill tank 2 initially, S8 is closed, operating L6 to open valve V6 (FIG. 2), allowing the tank to fill from an outside pressurized source. S13 is a float switch in storage tank 64 (FIG. 2) controlling on indicator light DS13 on panel 8 to indicate an empty storage tank. To fill the storage tank, switch S9 is closed actuating relay K11 closing hold contacts K111 and contacts K112. K112 actuates solenoid L1 to open valve V1 in intake pipe 62 to tank 64. A lamp DS14 is now on indicating at panel 8 that the storage tank is being filled. As the tank fills, a second float switch S14 in storage tank 64 closes, shorting out the "tank empty" light DS13. As the tank becomes full, float switch S13 is opened, releasing relay K11 and opening contacts K111 and K112, turning on a "storage tank full" light DS9, and closing valve V1.

Switch S10 is provided to initiate a tide effect in tank 2. When storage tank 64 is full, thereby closing float switch S14, closing S10 will actuate relays K8 and K9 closing hold contacts K81. Contacts K82 close to actuate solenoids L7 and L4 to open valve V7 in pipe 68 and valve V4 in pressure pipe 72 (FIG. 2). Contacts K91 close to start pump 66 in the manner described above. This pumps the contents of tank 64 into tank 2, raising the liquid level in the tank at a predetermined rate to create a tide effect. As tank 64 empties, float switch S14 opens, deactuating holding relay K8 and relay K9, switching off pump 66 and closing valves V7 and V4. When S14 opens, this breaks the circuit bypassing the "storage tank empty" indicator light DS13 and its series resistor, so that DS13 turns on.

To drain tank 2, switch S11 is closed actuating solenoids L5, L8 and relay K7. Relays L5 and L8 open valve V5 in return pipe 112 and valve V8 in pipe 146. Relay K7 closes switch K71 actuating solenoid L9 to open valve V9 in pipe 126. Relay K7 also closes contacts K72 to switch on pump 66 which causes tank 2 to be emptied through filter 124 and drain pipe 142.

Switch S12 is closed to heat the water in tank 64 when desired by operating relay K13 to close contacts K131 and K132, thereby completing the 220 volt power circuit to heater element H64. Heater indicator light DS15 is turned on simultaneously, as is a heater indicator light DS12 on panel 8. The heating circuit is broken by thermostat TH64 deactuating relay K13 when the liquid in tank 64 is sufficiently heated. A third float switch S15 in tank 64 completes a circuit through relay K12 and contacts K92 to open contacts K121 in series with switch S12 if tank 64 is not full to prevent closing of the tank heating circuit if the tank is empty.

When it is desired to pump the heated liquid into tank 2, the tide effect switch S10 is closed which actuates relay K9, thus opening contacts K92. This prevents energization of the heating circuit while the tank 64 is partially empty.

Four power supply circuits labeled "channel section," "section A," "section B," and "section C," for electromagnets 148 of the electromagnetic model locking system are shown in FIG. 4. Only one electromagnet 148 is shown in each circuit, but there may be several. In the preferred embodiment there are four in the channel section and three in each of the other sections. The labels "channel section," "section A," etc., designate abritrarily selected areas of tank 2 chosen for the location of models to facilitate a particular study or demonstration.

When switch S20 is closed connecting 110 volts to the primary winding of transformer T2, the current in the secondary winding is rectified and furnished selectively by switches S21 and S22 to the tank section circuits. Switch S22 when closed actuates relay K18 to switch contacts K181 and K182 to select either the circuits section A and section B, or section C, in an obvious manner. The electromagnets in a particular circuit can be changed at will if a particular arrangement of models is not adaptable to the present arrangement of electromagnets were required. Since tank 2 is made of steel plate, there is a stainless steel disk welded into a matching cutout in the bottom of the tank to provide a flux path through the bottom of the tank between each electromagnet and model. Resistors in the circuits of FIG. 4 are not labeled, since they all have the same function, i.e., limiting current through their respective indicator lights DS, and assuring the development of sufficient voltage across their respective parallel circuits.

Thus, it may be seen that the invention comprises a compact and efficient apparatus for readily duplicating and demonstrating waves, tides, winds and currents. Effects which formerly required months to observe in the field may, by use of the invention, be observed in minutes. To test apparatus such as structures, any combination of waves, tides, currents and winds may be created by pushing the appropriate buttons on a panel. Easily replaceable models may be tested to destruction rather than risk untried structures in the sea.

Many variations of the invention will be apparent to persons skilled in the art. It should therefore be understood that the inventiton is not confined to the embodiment disclosed but is limited only by the following claims.

What is claimed is:

1. In a simulator apparatus, the improvement comprising:
a tank, means for injecting liquid into said tank, means for generating waves in said tank, means for generating currents in said tank, means for generating tides in said tank, means for generating winds in said tank, control means for controlling said means to create waves, currents, tides, and winds in said tank to simulate any condition of waves, currents, tides, and winds in a marine environment, model means adapted for selective placement in said tank, means for locking said model means in said tank, particle distributing means attached to said tank, and means for injecting dyes into said tank.

2. The apparatus of claim 1, wherein said tank includes transparent sides and mirror means whereby the effects of said waves, currents, tides, and winds are observable from positions remote from said tank.

3. The apparatus of claim 2, wherein said means for generating waves comprise variable speed compressor means connected through variable speed valve means to a plenum chamber located in said tank whereby said waves are generated at the frequency of said variable speed valve means with a magnitude proportional to the speed of said variable speed compressor means.

4. The apparatus of claim 3 wherein said means for generating winds comprise second variable speed compressor means connected to air deflector means located in said tank whereby wind driven waves may be simulated.

5. The apparatus of claim 4, wherein said means for generating currents comprise a plurality of current nozzles adjustably located in said tank and adjustable valve means and pump means connected to selectively move said liquid in or out of said current nozzles.

6. The apparatus of claim 5, wherein said means for creating tides comprise adjustable valve means and pump means for selectively injecting said liquid into said tank at a selected rate.

7. The apparatus of claim 6, wherein said adjustable valve means are electrically operable by remote control means.

8. The apparatus of claim 7, wherein said locking means comprise a plurality of selectively controllable electromagnets.

9. The apparatus of claim 8, wherein a storage and heating tank means are connected to said adjustable valve and pump means whereby heated liquid may be injected into said tank.

10. The apparatus of claim 9, wherein said particle distributing means are movable hopper means adapted to travel along the length of said tank whereby particles may be introduced into said tank in any location and at a desired rate.

References Cited

UNITED STATES PATENTS

| | | | |
|---|---|---|---|
| 3,142,908 | 8/1964 | Annis et al. | 35—19 |
| 3,159,995 | 12/1964 | Elliott | 73—148 X |
| 3,287,967 | 11/1966 | Laurent | 73—148 |

EUGENE R. CAPOZIO, Primary Examiner

H. S. SKOGQUIST, Assistant Examiner

U.S. Cl. X.R.

73—148